United States Patent [19]

Jöhnk

[11] 4,273,803
[45] Jun. 16, 1981

[54] PROCESS FOR COVERING OR COATING ELECTRICAL COMPONENTS

[75] Inventor: Kurt Jöhnk, Neustadt, Fed. Rep. of Germany

[73] Assignee: Draloric Electronic GmbH, Fed. Rep. of Germany

[21] Appl. No.: 53,910

[22] Filed: Jul. 2, 1979

[51] Int. Cl.³ ............................................. B05D 5/12
[52] U.S. Cl. ...................................... 427/58; 427/79; 427/80; 427/299; 427/420; 427/421
[58] Field of Search ...................... 357/72; 427/58, 79, 427/80, 421, 420, 299

[56] References Cited

U.S. PATENT DOCUMENTS

| 3,736,179 | 5/1973 | De Gier et al. | 427/58 |
|---|---|---|---|
| 3,781,976 | 1/1974 | Tomiwa | 357/72 |
| 3,900,596 | 8/1975 | Lee | 427/421 |
| 3,958,039 | 5/1976 | Yabuki et al. | 427/58 |
| 3,967,000 | 6/1976 | Klein et al. | 427/80 |
| 4,001,655 | 1/1977 | Voyles et al. | 357/72 |
| 4,039,904 | 8/1977 | Klein et al. | 357/72 |
| 4,179,725 | 12/1979 | Maguire | 357/72 |

FOREIGN PATENT DOCUMENTS 1202852  6/1969  Fed. Rep. of Germany.
7709932 12/1977 Fed. Rep. of Germany.

Primary Examiner—John D. Smith

[57] ABSTRACT

The disclosure concerns a process for covering or coating an electric component with an insulating coating. The electric component has electric leads extending away therefrom beyond an edge thereof. The electric component is first wetted with a solvent. Thereafter a jet of a liquid covering or coating material is directed against at least one surface of the electric component and it migrates over the edge of the component also to the opposite surface of the electric component. The orientation of the electric component with respect to the jet flow and the placement of the jet flow with respect to the electric component is described.

10 Claims, 3 Drawing Figures

PROCESS FOR COVERING OR COATING ELECTRICAL COMPONENTS

BACKGROUND OF THE INVENTION

This invention relates to a process for covering or coating disk-shaped electric components with an insulating covering. The components have electric leads extending away from them.

One such process is disclosed in German Pat. No. 1,202,852. In that patent, the electrical component which is provided with leads is first dipped into a liquid and the wet surface of the component body is thereafter covered with a plastic powder. The plastic powder is melted and is hardened during a heat treatment. In this process, wetting of the leads by the liquid is reduced. But it cannot be completely avoided.

In another known process for covering a disk-shaped electric component, such as an electric capacitor, the component is dipped into a viscous synthetic resin covering or coating material until the edge of the disk from which the leads protrude is also covered with covering material. Due to the surface tension or the viscosity of the synthetic resin, it is necessary to immerse the component below the surface of the liquid. Due to this as well as to the forces of adherence, relatively prolonged wettings of the lead elements in the vicinity of the body of the component can, however, not be avoided.

If electric components that have been covered with an insulating covering by either of the above processes are inserted into the passage holes of printed circuits, the wetted or covered portions of the leads may extend through the passage hole so that dependable contacting with the leads, by soldering, for example, is prevented.

The electric component shown in German Utility Model No. 7,709,932 has stops for limiting the depth of insertion leads. Dependable contacting by soldering is assured by a bead-like widening of the leads. But, due to the finite length of the distance from the bead to the component, high-frequency behavior of the component is adversely affected, particularly in the case where the component is a capacitor.

SUMMARY OF THE INVENTION

The object of the present invention, therefore, is to provide a process by which an electrical component, usually of disk-shape, and having leads protruding from at least one side thereof, may be provided with an electric insulation covering, such that the leads remain substantially free of the covering or coating material.

According to the invention, an electric component, such as a capacitor, is to be covered or coated with a covering material or a coating composition, principally for insulative purposes. The electric component has electric leads attached to it. In a typical capacitor comprised of a central dielectric layer and conductive layers on opposite surfaces of the dielectric layer, there is a respective electric lead connected to each conductive layer. Typically, the electric leads extend away from and protrude beyond one edge of the electric component. Typically also, the electric component is flat surfaced and disk-like, although this is not necessarily true on all electrical components upon which the process of the present invention may be practiced.

During the covering process, the electric component is first wetted with an appropriate solvent liquid, for example, by dipping the component in a supply of the liquid, spraying the component with the liquid solvent, or the like. Thereafter, a jet of the covering material or coating composition in liquid form is sprayed against at least one surface of the electric component. In the preferred version, the liquid covering material also has a solvent and the solvent corresponds to or is the same as the solvent with which the electric component had been initially wetted. Only one surface of the electric component should be exposed to the jet of liquid covering material. This can be accomplished by directing the jet of covering material with an angle $\alpha$ against one surface of the electric component. The covering material should cover the surfaces of the electric component as well as to the forces of adherence and it is quite important that it cover over the edge or edges of the electrical component past which the leads extend as they protrude from the electric component.

For best results, the jet of liquid covering material is a coherent jet having a relatively clearly defined peripheral edge which is parallel to the direction of flow of the jet. That peripheral edge of the jet of covering material that is nearest to the edge of the electric component beyond which the electric leads extend is spaced a distance from that same edge of the electric component, and the covering material impinging on the electric component migrates toward the edge beyond which the leads extend. To assure most efficient flow of covering material, the electric component is oriented so that the jet of covering material does not strike the component at a right angle, but instead strikes it obliquely to the orientation of the principal surface against which the jet is directed. Where the electric leads extend away from the electric component from one edge thereof, the electric component is oriented so that the jet of covering material contacts the surface of the electric component then being coated so that the jet defines an acute angle with the leads at the edge of the electric component.

Use of the invention substantially avoids wetting and/or covering of the leads by the covering material. The process of the invention is also very simple and is capable of use in mass producing finished electric components. The process of the invention can be employed to particular advantage in the case of thin electric components, such as piezoelectric resonators or miniature rectangular capacitors. A considerable advantage is obtained by covering miniature rectangular capacitors in accordance with the invention, with respect to the natural-resonance behavior of the capacitors, since the self-inductance is greatly reduced by the avoidance of the wetted lengths. Another advantage resides in the good adherence of the covering material to the body of the electric component since the layer of the solvent which is first applied and which considerably increases the speed of wetting of the covering material is removed again, in great part, by the jet of liquid covering or coating material, which produces the insulation covering.

Other objects and features of the invention are explained below with reference to the drawings.

DESCRIPTION OF THE PREFERRED EMBODIMENT

Figure 1:
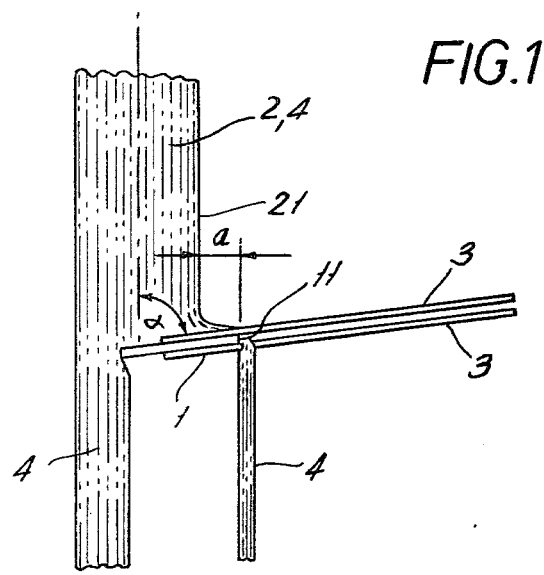
FIG. 1 is a diagrammatic view in elevation showing the process according to the invention for covering of an electric component.
Figure 2:
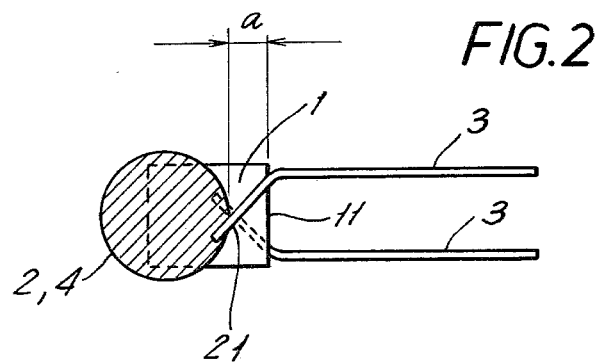
FIG. 2 is a diagrammatic plan view showing the process of FIG. 1.

FIGS. 1 and 2 show an electric component comprised of a rectangular, disk-shaped, almost wafer thin body 1. Two metal leads 3, each attached on a respective surface of the disk, protrude from the edge of the disk in the same direction.

The component 1 is first wetted on all sides with a solvent. The solvent is preferably the same solvent that is used in the jet 2 of liquid covering or coating material 4, in order to adjust the viscosity of the liquid covering material 4. The solvent is applied to the disk 1 by dipping the disk into a pool of solvent, by spraying solvent on both surfaces of the disk, or by other known application techniques.

Next, the disk 1 is sprayed with a jet 2 of covering material 4. As illustrated, the jet flows downwardly. The edge 21 of the jet 2 of covering material 4 that is nearest the edge 11 of the component body 1 is at a well-defined distance a from edge 11. As a result of the presence of solvent on the disk and in the jet 2, the speed of wetting is increased so that even with an acute angle $\alpha$ between the flow direction of the jet 2 and the surface of the component 1, the covering material 4 penetrates to the edge 11 and then also flows down in the space between the leads 3 as the leads pass near to each other at and near the edge 11 of the disk and as well as to the forces of adherence it flows to the opposite surface of the component 1. The pressure and the viscosity of the liquid jet 2 of covering material 4 are adjusted so that the covering material flows down over the edge 11 of the disk 1. By the flow over and across the component body 1, excess solvent which has initially been applied to the disk 1 is washed away and good adherence is thus obtained between the component 1 and the covering material. The covering sets on the disk and between the leads 3 and forms an insulating covering.

The jet of liquid covering material can alternatively be a multiple jet having jet components of preferably the same cross-section, or else of different cross-sections. It can also be a jet curtain, within which a plurality of identical or different electric components are positioned so as to be covered in a single operation.

Figure 3:
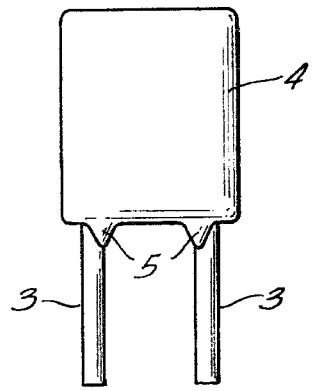
FIG. 3 shows a covered capacitor with radially protruding leads.

FIG. 3 shows a miniature rectangular capacitor with leads 3 that extend parallel to and each other and that are spaced a module distance apart. The wetting 5 of the leads 3 with the solvent and with the material of the covering 4 is negligibly slight.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A process for covering or coating an electric component having leads extending away from and beyond an edge of the electric component, comprising the steps of:
   wetting the electric component with a solvent;
   thereafter directing a jet of insulative liquid covering material against a surface of the electric component, the jet of liquid covering material having a peripheral edge parallel to the direction of motion of the covering material in the jet; the jet of covering material being so directed that the portion of the peripheral edge of the jet that is nearest the edge of the electric component beyond which the leads extend impinges upon the surface receiving the jet of covering material and is spaced approximately a predetermined distance from the edge of the electric component beyond which the leads extend.

2. The process for covering an electric component of claim 1, wherein the electric component is wetted by being dipped in solvent.

3. The process for covering an electric component of claim 1, wherein the electric component is wetted by solvent being sprayed thereon.

4. The process for covering an electric component of claim 1, wherein the pressure and viscosity of the jet of covering material are selected and coordinated so that the covering material flows over the edge of the electric component beyond which the leads extend, and onto the opposite surface of the electric component.

5. The process for covering an electric component of claim 1, wherein the covering material includes a solvent therein which corresponds to the solvent with which the electric component is wetted.

6. The process for covering an electric component of claim 1, wherein the jet of covering material is directed against a surface of the electric component at an angle to that surface other than a right angle.

7. The process for covering an electric component of claim 6, wherein during the directing of a jet of covering material against a surface of the electric component, the electric component is oriented so that the jet of covering material contacts the surface of the electric component so as to define an acute angle with the leads.

8. The process for covering an electric component of claim 5, wherein the pressure and viscosity of the jet of covering material are selected and coordinated so that the covering material flows over the edge of the electric component beyond which the leads extend and onto the opposite surface of the electric component.

9. The process for covering electric component of claim 1 wherein the solvent is at least partially removed during the jet directing step.

10. The process for covering an electric component of claim 9, wherein the covering material includes a solvent therein which corresponds to the solvent with which the electric component is wetted.

* * * * *